H. P. KRAFT.
SPREADER FOR PNEUMATIC TIRES.
APPLICATION FILED JUNE 15, 1917. RENEWED SEPT. 7, 1920.

1,391,482. Patented Sept. 20, 1921.

WITNESSES:
Rene Bruine
Mary W. Fraser

INVENTOR :
Henry P. Kraft.
By Attorneys,
Fraser, Turk & Myers

UNITED STATES PATENT OFFICE.

HENRY P. KRAFT, OF RIDGEWOOD, NEW JERSEY.

SPREADER FOR PNEUMATIC TIRES.

1,391,482. Specification of Letters Patent. Patented Sept. 20, 1921.

Application filed June 15, 1917, Serial No. 174,865. Renewed September 7, 1920. Serial No. 408,772.

*To all whom it may concern:*

Be it known that I, HENRY P. KRAFT, a citizen of the United States of America, residing in Ridgewood, in the county of Bergen and State of New Jersey, have invented certain new and useful Improvements in Spreaders for Pneumatic Tires, of which the following is a specification.

This invention relates to spreaders or bridge washers such as are used in pneumatic tires of the clencher type in association with the air valve at its connection with the inner tube of such tires.

Such spreader is applied at the inner end of the pneumatic tire valve and engages the inner sides of the pneumatic casing or tire shoe to prevent creeping and to assist in holding the shoe in place on the rim. Such spreaders have the function of "bridge washers" (so called) in that they bridge over a portion of the tapering space between the shoe beads so as to lift the valve at its attachment closer toward the tread of the tire and thereby afford room for the clamping of the inner tube to the tire valve. It is common to form the spreader with side flanges which conform to the sloping sides of the beads of the shoe and thus more effectively hold the shoe beads apart. In the following description the term "spreader" will be used as equivalent for "bridge washer," it being understood that the inclined side flanges are desirable but not essential to the present invention.

The present invention relates particularly to spreaders which are made of thin metal and are preferably stiffened by means of corrugations. The purpose of the invention is to afford a strong and resistant connection between the spreader and the tire valve. To this end a ring of thick and rigid metal is applied to the spreader at the tire valve opening and is fastened rigidly to the spreader so as to form essentially a part thereof. This reinforcing ring is either fastened directly to the hub portion of the spreader or it is united thereto by the addition of a ring washer, the latter being the preferred construction.

The drawings illustrate suitable embodiments of the invention.

Figure 1:
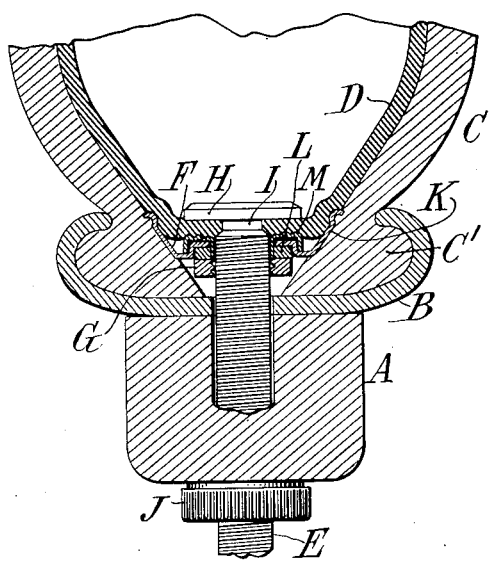
Figure 1 is a transverse section of the vehicle wheel with its felly, rim, tire shoe, inner tube and tire valve.

Referring to the drawings, A is the felly, B the wheel rim, C the tire shoe having the usual beaded flanges C' which are held in the clencher flanges of the rim, D the inner tube and E the shank or casing of the tire valve (commonly called the stem); and F is a spreader.

In the present case the spreader F is shown as made of thin metal (preferably sheet steel) which is transversely corrugated to give it stiffness. This construction is not herein claimed, being set forth in my application No. 155,821, filed March 19, 1917.

Figure 2:
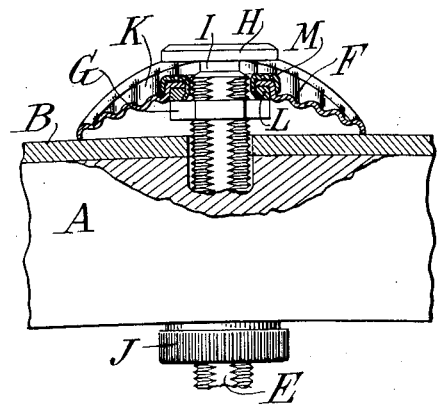
Fig. 2 is a fragmentary mid-section thereof in a plane at right angles to Fig. 1, the tire shoe and inner tube being omitted.

The spreader bears at its narrowed ends against the rim and its middle portion is bowed or arched upwardly as shown in Fig. 2. This affords room for the clamping nut G which screws on the threaded exterior of the valve shank to clamp the inner tube tightly against the end flange or foot H of the tire valve. This valve is customarily formed with a reduced neck I between its threaded portion and the end flange; and the valve shank is also flattened on opposite sides as shown to give it a non-rotative engagement with the spreader. To accomplish this the spreader is made with its opening *a* with flattened sides *b*. Thus the tire valve is held from turning when the usual clamping nut J is screwed up.

The spreader has its lateral sides turned up to form side flanges K K which lie flat against the inclined inner faces of the beaded flanges of the tire shoe; as stated above these are preferable but not necessarily essential to the present invention.

Figures 4, 5:
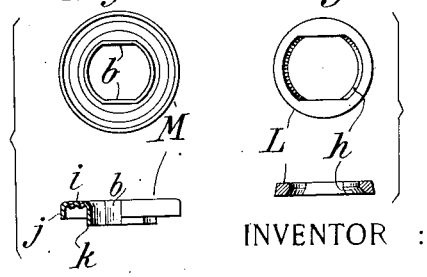
Fig. 4 is a plan and transverse section of the reinforcing ring.
Fig. 5 is a plan and sectional elevation of the ring washer.

When the spreader is made of thin metal, some difficulty is encountered in providing a stable connection with the valve shank and a proper bearing for the clamping nut G. In the construction shown in my said application No. 155,821, the spreader is struck up around the valve opening a to form an elevated boss or hub between which and the foot flange H the inner tube is clamped. This leaves a recess on the opposite side which receives the clamping nut G. According to the present invention the corresponding recess is filled with a reinforcing ring L of relatively thick metal. This ring L is shown separately in Fig. 4.

Figure 7:
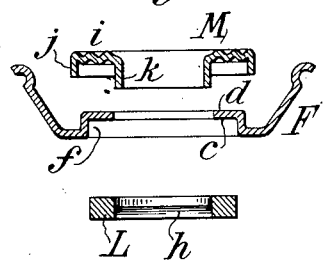
Fig. 7 is an enlarged transverse section, corresponding to Fig. 1, of the spreader parts separated.

Referring to Fig. 7 the spreader F is struck up at its center to form a cupped portion c which on its upper side appears as a boss d and on its under side forms a recess f. This recess is shown as circular so that it receives somewhat snugly the circular exterior of the reinforcing ring L, the latter being of such thickness as to fill the recess about flush. The reinforcing ring is held in the recess by a clenching operation of any suitable kind so that it is confined reliably in place.

Figure 6:
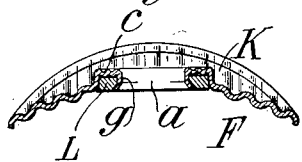
Fig. 6 is a section of the spreader in the same plane as Fig. 2 but showing another construction.

One suitable construction is shown in Fig. 6 where the struck-up portion c of the spreader is formed with an inner flange g which extends downwardly to the full depth of the recess and within the hole in the ring L; after the ring is in place this flange or neck g is swaged outwardly so as to embrace a portion of the inner face of the reinforcing ring and hold the latter firmly in place. Since the hole a is flattened on opposite sides, it is desirable that a snug fit be made on these sides with the flattened sides of the ring, which precludes any clenching attachment to these flat sides; accordingly the ring is formed with tapered surfaces h at only the rounded ends of its opening, these tapered faces being engaged by the swaged-out neck g as shown in Fig. 6. This construction is a very simple one, the use of a separate ring-washer being avoided; to this end the upper face of the boss formed by the struck-up hub c is formed with concentric corrugations as is customary in ring washers (the construction thus being comparable to that set forth in my Patent No. 1,199,907, dated October 3, 1916).

In some cases it is undesirable to have the corrugated clamping face for engaging the inner tube of the same metal as the spreader (usually sheet steel), it being preferable to have this clamping face of non-oxidizable metal (as brass). In such cases it is preferable to make use of a distinct ring washer M, such as is shown separately in Fig. 5. This is the common and usual construction of a ring washer, having a corrugated upper face i, an outer flange j, and an inner flange or neck k. This ring washer is applied on top of the circular boss c of the spreader with its outer flange j hugging such boss and its inner flange k passing down through the opening in the reinforcing ring and clenched outwardly to engage the latter. The opening through the neck k has flat sides b b as described for engaging the flats of the valve shank; and the curved portions of the flange k are the ones which are struck outward to confine the reinforcing ring (in the same manner as with the construction shown in Fig. 6).

Figure 3:
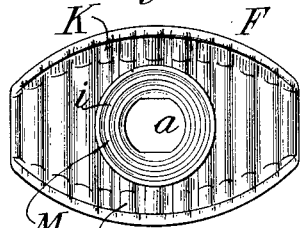
Fig. 3 is a plan of the spreader alone.

The construction of spreader provided by the present invention is very stiff, light and strong. It is also very cheap, being produced by resorting to the usual stamping and cupping operations. In the construction shown in Figs. 1, 2 and 3 with a ring washer of brass or other non-rusting metal, the spreader proper being of corrugated sheet steel, the construction has all the desirable qualities of combined lightness and strength with freedom from possibility of rusting at its engagement with the inner tube. In the construction of Fig. 6, freedom from rusting may be secured by galvanizing or otherwise coating the parts either before or after assembly.

The constructions herein described may be varied in matters of detail without departing from the essential features of the invention which are set forth in the claims.

Cross-reference is hereby made to an application filed as a division of the present application on November 15, 1920, Serial No. 424,094, which divisional application is based upon the construction shown in Fig. 6, which construction, being claimed in said divisional application, is specifically disclaimed in the present application.

I claim as my invention:—

1. A tire spreader of sheet metal formed around the tire valve opening with an annular projection or boss on one side and a corresponding recess on the other side, and a reinforcing ring in said recess.

2. A tire spreader of sheet metal formed around the tire valve opening with an annular projection or boss on one side and a corresponding recess on the other side, and a reinforcing ring in said recess and fastened therein.

3. A tire spreader of sheet metal formed around the tire valve opening with an annular projection or boss on one side and a corresponding recess on the other side, and provided with an inner flange projecting within said recess, and a reinforcing ring filling said recess and fastened therein by means of said inner flange.

4. A tire spreader of sheet metal formed around the tire valve opening with an annular projection or boss on one side and a corresponding recess on the other side, a reinforcing ring fastened in said recess, and a ring washer embracing said boss, formed with an inner flange entering through the reinforcing ring and engaging the latter to hold it in place.

5. A tire spreader of sheet metal having a flattened central opening for the valve and formed around said opening with an annular projection forming a boss on one side and a recess on the other, and provided with an internal flange surrounding said opening with flat faces on opposite sides, and a reinforcing ring formed with flat faces on opposite sides of its opening and with bevel curved faces, and said inner flange turned outwardly at its curved portions to engage said bevel faces and hold the ring in said recess.

In witness whereof, I have hereunto signed my name.

HENRY P. KRAFT.